(12) United States Patent
Böld et al.

(10) Patent No.: US 9,972,160 B2
(45) Date of Patent: May 15, 2018

(54) METHOD FOR CHARGING AN ACCUMULATOR INCORPORATED IN AN ELECTRICAL MOTOR VEHICLE

(75) Inventors: Martin Böld, Regensburg (DE); Herbert Halamek, Wolfratshausen (DE)

(73) Assignee: Continental Automotive GmbH, Hannover (DE)

( * ) Notice: Subject to any disclaimer, the term of this patent is extended or adjusted under 35 U.S.C. 154(b) by 996 days.

(21) Appl. No.: 14/344,510

(22) PCT Filed: Sep. 11, 2012

(86) PCT No.: PCT/EP2012/067694
§ 371 (c)(1),
(2), (4) Date: Oct. 9, 2014

(87) PCT Pub. No.: WO2013/037748
PCT Pub. Date: Mar. 21, 2013

(65) Prior Publication Data
US 2016/0200204 A1    Jul. 14, 2016

(30) Foreign Application Priority Data

Sep. 13, 2011   (DE) .................... 10 2011 082 623

(51) Int. Cl.
*H02J 7/00*        (2006.01)
*G07F 15/00*       (2006.01)
*B60L 11/18*       (2006.01)

(52) U.S. Cl.
CPC ........ *G07F 15/005* (2013.01); *B60L 11/1816* (2013.01); *B60L 11/1846* (2013.01);
(Continued)

(58) Field of Classification Search
CPC ... Y02T 90/14; Y02T 90/128; Y02T 90/7088; Y02T 10/7005; Y02T 10/7044;
(Continued)

(56) References Cited

U.S. PATENT DOCUMENTS

2003/0026087 A1*  2/2003  Gesue ............... F21S 6/001
                                            362/95
2007/0282495 A1   12/2007  Kempton et al.
(Continued)

FOREIGN PATENT DOCUMENTS

CN          101895137        11/2010
DE      10 2008 050 021 A1    5/2009
(Continued)

*Primary Examiner* — Yalkew Fantu
*Assistant Examiner* — Mohammed J Sharief
(74) *Attorney, Agent, or Firm* — Cozen O'Connor

(57) ABSTRACT

A method for charging an accumulator in an electrical motor vehicle includes connecting the accumulator to a low voltage power outlet connected to a power supply network. A counter identifier of a stationary electric meter that measures electrical energy supplied by the energy supply network via the power outlet is transmitted to a central computer. The vehicle location of the electrical motor vehicle is transmitted to the central computer and the central computer compares a counter location associated with the electrical meter with the transmitted vehicle location of the motor vehicle. In case of agreement between the counter location and the transmitted vehicle location, a charging signal which initiates the charging of the accumulator is sent from the central computer to the charging device of the electrical motor vehicle.

7 Claims, 1 Drawing Sheet

(52) U.S. Cl.
CPC ....... *B60L 11/1848* (2013.01); *B60L 11/1861* (2013.01); *B60L 2240/622* (2013.01); *B60L 2240/72* (2013.01); *B60L 2240/80* (2013.01); *Y02T 10/705* (2013.01); *Y02T 10/7005* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
CPC .............. Y02T 10/705; Y02T 10/7072; Y02T 10/7291; Y02T 90/121; Y02T 90/16; Y02T 90/162; Y02T 90/163; Y02T 90/169; Y02T 10/7008; B60L 11/1816; B60L 11/1846; B60L 11/1848; B60L 11/1861; B60L 2240/622; B60L 2240/72; B60L 2240/80; G07F 15/005; Y04S 30/14; Y02E 60/12
USPC .................................................. 320/109, 104
See application file for complete search history.

(56) References Cited

U.S. PATENT DOCUMENTS

| | | | |
|---|---|---|---|
| 2009/0091291 A1 | 4/2009 | Woody et al. | |
| 2009/0174365 A1* | 7/2009 | Lowenthal | B60L 11/1816 320/109 |
| 2009/0184689 A1 | 7/2009 | Kressner et al. | |
| 2009/0210357 A1* | 8/2009 | Pudar | B60L 11/1816 705/412 |
| 2010/0225475 A1* | 9/2010 | Karch | B60L 11/1824 340/540 |
| 2010/0274690 A1 | 10/2010 | Tate, Jr. | |
| 2012/0280646 A1* | 11/2012 | Gale | H02J 7/04 320/104 |
| 2013/0285608 A1* | 10/2013 | Jikihara | B60L 11/1861 320/109 |

FOREIGN PATENT DOCUMENTS

| | | | |
|---|---|---|---|
| DE | 10 2008 044 526 A1 | 3/2010 | |
| DE | 10 2008 044 527 A1 | 3/2010 | |
| DE | 10 2010 018 451 A1 | 1/2011 | |
| DE | 10 2009 043306 A1 | 3/2011 | |
| DE | 10 2010 009 583 A1 | 9/2011 | |
| WO | WO 2012093638 A1 * | 7/2012 | ............ H01M 10/48 |

* cited by examiner

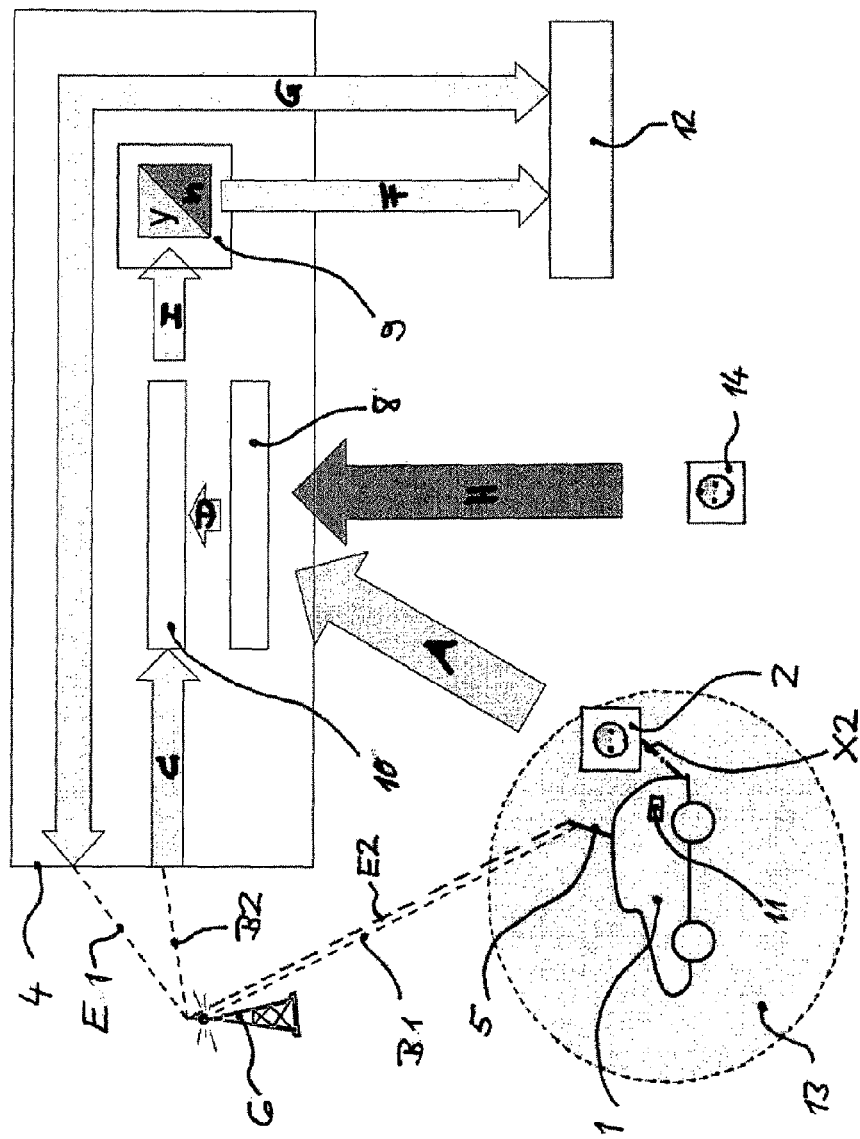

METHOD FOR CHARGING AN ACCUMULATOR INCORPORATED IN AN ELECTRICAL MOTOR VEHICLE

CROSS-REFERENCE TO RELATED APPLICATIONS

This is a U.S. national stage of application No. PCT/EP2012/067694, filed on 11 Sep. 2012, which claims priority to the German Application No. 10 2011 082 623.8, filed 13 Sep. 2011, the content of both incorporated herein by reference.

BACKGROUND OF THE INVENTION

1. Field of the Invention

The invention relates to a method for charging an accumulator, which is incorporated in an electric motor vehicle, for storing electrical energy for the operation of an electric drive motor of the electric motor vehicle with electrical energy taken from an energy supply network.

2. Related Art

Electric motor vehicles utilize accumulators, which store the electrical energy required for driving the electric motor vehicles, in particular, for the operation of the electric drive motors of the electric motor vehicles. The accumulators are charged up via an energy supply network, generally referred to as a power network. DE 10 2008 044 526 A1 discloses a method and system which provide the use of stationary charging stations, which are in each case connected, via a first communication connection to a memory and consumption unit and, via a second communication connection, to a billing server. Furthermore, DE 10 2008 044 527 A1 discloses a mobile electricity meter for obtaining electricity independent of location at a stationary charging station, in which the mobile electricity meter is integrated in a mobile memory and consumption unit or is mountable thereon.

SUMMARY OF THE INVENTION

An object of the present invention is to specify a method which, in a simple and inexpensive manner, enables both a straightforward charging of the accumulator and a reliable billing of the amount of energy taken from the energy supply network for the charging.

This object is achieved according to aspects of the invention by a method of the type described herein, in which the accumulator is connected to a plug socket, which is connected to the energy supply network and is in the form of a low-voltage plug socket, wherein a meter identifier of a stationary electricity meter, which measures the electrical energy supplied from the energy supply network via the plug socket, is transmitted to a central computer, wherein the vehicle location of the electric motor vehicle is transmitted to the central computer, wherein a meter location assigned to the electricity meter is compared to the transmitted vehicle location of the electric motor vehicle by the central computer and wherein, in the case of agreement between the meter location and the transmitted vehicle location, a charging signal, which initiates the charging of the accumulator, is sent from the central computer to a charging device of the electric motor vehicle, which charging device controls the charging of the accumulator.

In an aspect of the invention, the term electric motor vehicle is not restricted to a vehicle that exclusively has an electric drive motor. Rather the electric motor vehicle can also be a hybrid electric motor vehicle that has both an electric drive motor and at least one other drive motor, for example an internal combustion engine.

In an aspect of the present invention, it is particularly advantageous that no expensive charging infrastructure is necessary to charge the accumulator. In particular, it is not imperative that charging takes place at special charging stations having particular equipment for identifying the user and/or the vehicle and for controlling the charging. Instead, the method according to an aspect of the invention provides the use of a conventional low-voltage plug socket, as is present in every household. Such a plug socket is usually also referred to as a household plug socket. Additional apparatus on the plug socket, such as sending/receiving apparatus or equipment for controlling the charging, for example, is superfluous with aspects of the invention. In one aspect, the plug socket can preferably be a single-phase alternating current plug socket for power supply at a voltage of 230 V or a three-phase alternating current plug socket for power supply at a voltage of 400 V. The accumulator is connected to the plug socket, for example, by an electric charging cable or, for example, by an inductive charging apparatus.

In accordance with an aspect of the present invention, the electrical energy supplied from the energy supply network via the plug socket is measured using an electricity meter. In principle, the electricity meter is assigned to a particular customer and a particular location, for example by assignment to a postal address. In order to prevent misuse, an advantageous aspect of the invention provides that a meter identifier, for example simply a meter number, of the electricity meter is transmitted to a central computer. This can occur, in one aspect, for example, by a vehicle user of the electric motor vehicle manually inputting the meter identifier into a mobile telephone and transferring the identifier to the central computer via a mobile telephone connection of a mobile telephone network. In another aspect, for example, the meter identifier is input into a computer, for example a personal computer (PC), and the identifier is transferred to the central computer via a wired or wireless data connection. The meter identifier makes it possible to unambiguously assign electrical energy taken from the energy supply network to a particular electricity meter and thus to a particular household or assigned customer of an energy supplier providing the electrical energy, with the result that billing, assigned thereto, of the electrical energy taken can occur.

According to an aspect of the invention, the vehicle location is specified by vehicle position data. This can simply be GPS (global positioning system) data. Preferably, the vehicle position data is transmitted to the central computer via a mobile telephone connection, for example a GSM (global system for mobile communications) connection. The vehicle location is preferably specified with a tolerance range.

In one aspect, the central computer, which can preferably be a so-called back-end server, could be, for example, a computer of an energy supplier that supplies electrical energy in the energy supply network. However, the central computer is preferably not one and the same as the computer of the energy supplier, but at least temporarily connected to said computer for data transmission; thus, it is possible for the charging of accumulators of electric motor vehicles to be processed via a common central computer independently of the energy supplier. In principle, the accumulator can therefore be charged according to the invention using any energy supplier that feeds electrical energy into the energy supply network and with which optionally a supply contract exists between, for example, a vehicle user or plug-socket owner and energy supplier.

Expensive maintenance and upkeep of, for example, charging stations or specially equipped plug sockets having, for example, an identification apparatus and optionally charging control equipment is not necessary with the invention. As a result, the maintenance and upkeep costs are advantageously low.

According to an aspect of the present invention, a charging of the accumulator only takes place with the inventive method when the charging signal has been sent to the charging device. The charging signal initiates the charging of the accumulator, wherein both a direct start of the charging after receipt of the charging signal by the charging device and a temporally offset charging are conceivable. The charging of the accumulator is controlled by the charging device on the basis of the charging signal and, optionally, further charging data received from the central computer. The charging data is made available by the central computer and/or the computer of the energy supplier and can contribute, for example, to avoiding overloading of the energy supply network if they comprise, for example, specifications for a charging instant and/or a charging speed for the charging device.

According to an advantageous aspect of the invention, a vehicle identifier is transmitted to the central computer. Preferably, the vehicle identifier is transmitted to the central computer before the start of the charging of the accumulator; preferably, the vehicle identifier is transmitted together with the vehicle location to the central computer. Thus, an unambiguous assignment of electrical energy taken from the energy supply network to a particular electric motor vehicle—and therefore to the vehicle owner or, if appropriate, the vehicle user—is made possible. Preferably, the vehicle identifier is transmitted to the central computer via a mobile telephone connection, for example a GSM connection. With the abovedescribed development of the invention, it is possible for the energy supplied for charging the accumulator to be billed not only via the plug socket and the associated electricity meter but rather individual vehicle billing can also be performed. In particular, supply and billing of energy allocations, which may have been purchased with a purchase or a rental of the electric motor vehicle, can therefore also occur.

It is possible to achieve utilization that is as balanced as possible of the energy supply network if, according to another advantageous aspect of the invention, charging data comprising a charging instant is sent together with the charging signal from the central computer to the charging device. Therefore, with the charging data, the charging device receives not only, by the charging signal, the information that the charging has been approved and can be started but also, by the charging instant, information about when the charging should occur.

It is provided according to another advantageous aspect of the invention that a charging plan, which specifies at least a charging period and an amount of charging energy, is generated by the central computer or by a computer connected to the central computer, of an energy supplier supplying electrical energy in the energy supply network and that charging data comprising the charging plan is transmitted from the central computer to the charging device. In this way, overloading of the energy supply network, for example, can also be predictively avoided if, in general, a large number of connected electrical loads are present or are to be expected and, in addition, accumulators of several electric motor vehicles are to be charged. The charging plan can also comprise, for example, an allocation of electrical energy dependent on the time of day and/or user contract.

According to another advantageous aspect of the invention, the charging device starts the charging of the accumulator on the basis of the charging signal and the charging data and controls the amount of energy to be taken from the energy supply network to charge the accumulator. As a result, the actual charging process can take place independently of the central computer or the computer of the energy supplier, controlled solely by the charging device of the electric motor vehicle, but yet with higher-level information contained in the charging data and which relates, for example, to the energy supply network, being taken into account.

It could be conceived that a fixed value, for example a power of 2 kW, is assumed for a maximum current loading capacity of the plug socket and the charging of the accumulator is correspondingly controlled by the charging device. However, it is advantageous if, according to another aspect of the invention, before the charging signal is sent, a value for the maximum current loading capacity of the plug socket is transmitted to the central computer, with the result that the information relating to the maximum current loading capacity can be taken into account by the central computer and/or the computer of the energy supplier for the charging signal, but also in particular for an even more precise generation of a charging plan.

It is likewise advantageous for generation of a charging plan that is as precise as possible if, according to another aspect of the invention, before the charging signal is sent, a value for the charging state of the accumulator is transmitted to the central computer, with the result that this information relating to the charging state of the accumulator can be taken into account by the central computer and/or the computer of the energy supplier.

According to another advantageous aspect of the invention, during the charging of the accumulator by the charging device, a value for the respective charging state of the accumulator is regularly transmitted to the central computer. In this way, for example in the event of a heavy loading of the energy supply network, the individual charging of the accumulator of the single electric motor vehicle can be adapted at short notice and, if appropriate, temporally extended.

If, according to another advantageous aspect of the invention, after the charging of the accumulator by the charging device has finished, a value for the amount of energy taken from the energy supply network for the present charging of the accumulator is transmitted to the central computer, in this way it is possible for the value for the amount of energy taken to be compared with the value determined by the meter state of the electricity meter for the amount of energy taken and thus the billing of the amount of energy can occur in an even more reliable manner.

BRIEF DESCRIPTION OF THE DRAWING

An exemplary embodiment of the invention is described in more detail below with reference to the drawing, in which:

The Single FIGURE shows an illustration of a method for charging an accumulator which is incorporated in an electric motor vehicle.

The FIGURE shows a schematic illustration of a method for charging an accumulator incorporated in an electric motor vehicle 1 for storing electrical energy for the operation of an electric drive motor of the electric motor vehicle 1 with electrical energy to be supplied from an energy supply network. In this case, the accumulator is connected to a plug socket 2, which is connected (dash-dotted line X2) to the energy supply network and is in the form of a low-voltage plug socket.

An arrow A symbolizes a transfer, to a central computer 4, of a meter identifier of a stationary electricity meter that measures the electrical energy supplied from the energy supply network via the plug socket 2. Dashed lines B1, B2 symbolize a transfer of the vehicle location of the electric motor vehicle 1 to the central computer 4 from an antenna 5 of the electric motor vehicle 1 and with intermediate connection to a radio station 6.

A meter location assigned to the electricity meter, determined by the meter identifier, is stored in a memory 8 of the central computer 4. The vehicle location, symbolized by a first arrow C, and the meter location, symbolized by a second arrow D, enter a comparator 10 of the central computer 4. The vehicle location and meter location are compared with one another. The result of the comparison is passed to a control element 9 (arrow I) and indicates that either yes (y) there is an agreement or no (n) there is no agreement. Since a complete agreement of data specifying the vehicle location and data specifying the meter location is not intended to be regularly achieved because the electricity meter and electric motor vehicle cannot in principle technically be in one and the same location, a tolerance range 13 is provided around the electric motor vehicle 1, within which range the electricity meter—symbolized here by the plug socket 2—must be arranged so that an agreement between vehicle location and meter location is assumed.

In the event of an agreement between the stored meter location and the transmitted vehicle location, a charging signal, which initiates the charging of the accumulator, is sent—symbolized here by dashed lines E1, E2—via an intermediate connection to the radio station 6 from the central computer 4 to a charging device 11 of the electric motor vehicle 1, which charging device controls the charging of the accumulator.

For this purpose, the result of the comparison of stored meter location and transmitted vehicle location is firstly passed—as symbolized by an arrow F—to a computer 12 of an energy supplier supplying electrical energy in the energy supply network, the computer being connected to the central computer 4 via a data connection. For example, taking into account a present utilization of the energy supply network, the central computer 4 receives—symbolized here by an arrow G—information for generating the charging signal from the computer 12 of the energy supplier. By way of example, this information may contain notification that the charging of the accumulator must occur in a particular number of hours; in a case such as this, the charging signal generated by the central computer 4 also obtains charging data comprising a charging instant, that is to say a time component instructing the charging device 11 to start the charging in the corresponding number of hours.

In the case described previously, there is an agreement between meter location and vehicle location. If, however, a meter identifier of a further stationary electricity meter, which measures the electrical energy supplied via another plug socket 14 from the energy supply network, is transmitted—symbolized in the FIGURE by an alternative arrow H—to the central computer 4, then the meter location, which is assigned to the electricity meter, does not agree with the transmitted vehicle location and no charging signal is sent from the central computer 4 to the charging device 11 of the electric motor vehicle 1. In a case such as this, it can be concluded from the different locations of electricity meter and electric motor vehicle 1 that the electric motor vehicle 1 is not actually intended to be charged up at the specified plug socket 14. The cause of this could be, for example, erroneous indication of the meter identifier—caused by technical problems or accidental—or attempted misuse.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for charging an accumulator, the accumulator being (a) connectable to a plug socket (2) connected to an energy supply network, and (b) incorporated in an electric motor vehicle (1) for storing electrical energy for the operation of an electric drive motor of the electric motor vehicle (1) with electrical energy received from the energy supply network, the method comprising:
   receiving, by a central computer (4), a meter identifier of a stationary electricity meter, which measures the electrical energy supplied from the energy supply network via the plug socket (2);
   receiving, by the central computer (4), a vehicle location of the electric motor vehicle (1);
   comparing, by the central computer (4), a meter location assigned to the electricity meter to the received vehicle location of the electric motor vehicle (1);
   upon agreement between the compared meter location and the transmitted vehicle location, sending, by the central computer (4):
      (a) a charging signal, which initiates the charging of the accumulator; and
      (b) charging data comprising an indication of when charging should occur, to a charging device (11) of the electric motor vehicle (1), which charging device (11) is configured to control the charging of the accumulator;
   generating, by the central computer (4) or by a computer (12) connected to the central computer (4), a charging plan that specifies at least a charging period, an amount of charging energy of an energy supplier supplying electrical energy in the energy supply network, and an allocation of electrical energy, the allocation being dependent on time of day;
   transmitting, by the central computer (4) to the charging device (11), the charging data comprising the charging plan;
   charging and controlling, by the charging device (11), the accumulator according to the charging plan; and
   during the charging of the accumulator by the charging device (11), regularly receiving by the central computer (4) a value for the respective charging state of the accumulator, and, upon loading of the energy supply network exceeding a predetermined value, temporally extending the charging of the accumulator of the vehicle.

2. The method as claimed in claim 1, further comprising the central computer (4) receiving a vehicle identifier.

3. The method as claimed in claim 1, wherein the charging device (11) starts the charging of the accumulator on the basis of the charging signal and the charging data and controls the amount of energy to be taken from the energy supply network to charge the accumulator.

4. The method as claimed in claim 1, wherein, before the charging signal is sent by the central computer (4), a value for the maximum current loading capacity of the plug socket (2) is received by the central computer (4).

5. The method as claimed in claim 1, wherein, before the charging signal is sent by the central computer (4), a value for a charging state of the accumulator is received by the central computer (4).

6. The method as claimed in claim 1, wherein, after the charging of the accumulator by the charging device (11) has finished, a value for the amount of energy taken from the energy supply network for the present charging of the accumulator is received by the central computer (4).

7. The method as claimed in claim 1, wherein the plug socket is a low-voltage plug socket.

* * * * *